3,516,169
POINT GAUGES OR MEASURING BARS
Harry Hanvy, 249 Astley St., Dukinfield,
Cheshire, England
Filed Feb. 2, 1968, Ser. No. 702,588
Int. Cl. G01b *3/30*
U.S. Cl. 33—168                                    12 Claims

ABSTRACT OF THE DISCLOSURE

A point gauge comprising a longitudinal body with a cylindrical hole in at least one end. The hole has a cylindrical outer part and a screw-threaded inner part and is adapted to receive an end piece. The end piece consists of an outer portion, a non-threaded lead-in, and an inner portion, the inner portion being screw-threaded and mating with the inner part, at least part of the lead-in being of larger diameter than the outer part and adapted for insertion therein to form an interference fit. The lead-in and the outer part interengage and create substantial pressure between the lead-in and the outer part due to resistance to expansion of the outer part as the lead-in enters it, thereby retaining the end piece in the hole independently of the screw threads.

---

The present invention relates to point gauges sometimes called pin gauges and measuring bars.

At present, point gauges which are used for measuring or checking the dimensions of bores and recesses are made from bars of mild steel or suitable tool steel. The gauges are inserted in the bore or recess whose dimension is to be determined, the length dimension of the gauge lying along the dimension under investigation. If this dimension is the same length as the gauge, the gauge will be a close fit in the bore or recess.

After continued use, the ends of the gauge wear down through contact with the walls of the bores or recesses and the length of the gauge is reduced below its correct length. In order to bring the gauge back to its correct length, the gauge is beaten on an anvil and then allowed to settle for a period of at least 24 hours before being ground down to length once more. Readjustment of the length of the gauge may be necessary after only two or three hundred measuring operations have been effected with the gauge and the fact that the readjustment process is so tedious and unsure is therefore most unsatisfactory.

The present invention provides a point guage or a measuring bar which is adjustable in length to a sufficient extent to accommodate such wear as can be expected in a reasonable period of life for the gauge or bar. The adjustment can be carried out in a simple way without the hammering previously necessary and yet after adjustment the length of the gauge or bar remains completely accurate within the limits demanded of such instruments.

According to the invention, there is provided a point gauge or a measuring bar comprising a body having at one end a hole a part of which is formed with a screw thread, and also comprising an end piece a part of which is formed with a screw thread adapted to mate with the screw thread in the hole, the end piece being engaged in the hole with its screw thread mated with the screw thread of the hole and a further part of the end piece being tightly engaged with a further part of the hole in which the said further part of the end piece is an interference fit thereby jamming the end piece firmly in position in the hole.

The normal practice when using measuring gauges of the kind described in the introductory portion of the specification is in fact to have two gauges, one slightly larger than the other, so that a user can employ one gauge to provide an indication of a minimum acceptable dimension, and the larger gauge to check whether or not the diameter of the bore or recess is greater than the allowed tolerance. If the smaller gauge fits with a slight amount of clearance and this gauge is in fact of such a size to indicate the minimum dimension, it will give an indication that the bore is greater than the minimum allowable, but will not of course indicate by how much it is greater, and thus it is necessary to ascertain whether or not the bore is within the tolerance range, hence the use of the larger measuring device, which if it will not go into the bore indicates that the bore is within the allowed tolerance. If it will just fit, it will indicate that the bore is of the maximum size, and if it fits with clearance it will indicate that the bore is oversized and that the component is to be rejected.

The body of the gauge or bar may be a mild steel or suitable gauge steel bar of square section. The end of the gauge or bar remote from the said one end may also have an adjustable end piece screwed into it in the same way as described above. As another alternative, this end may be formed with a hole in which an end piece which is an interference fit in the hole is firmly pressured until it reaches a shoulder or the end of the hole.

The end piece or each end piece is advantageously made from tool steel and the parts of it which project or which engage with the sides of its hole are advantageously ground and lapped to give a very smooth finish. The parts of the side of the hole which mate with the end piece are also advantageously ground and lapped.

Preferably, the adjustable end piece is screw-threaded on the part which penetrates deepest into the hole and between the screw threaded portion of the tread and the part which engages the sides of the hole is a lead-in. From the lead-in to its outer end the end piece is preferably formed with a slight taper.

The invention includes a body member and an end piece or end pieces for making up a point gauge or measuring bar as described above.

The invention also includes a method of manufacturing a point gauge or a measuring bar as described above in which method an adjustable oversize end piece is screwed into the body of the gauge or bar as far as it will go, the oversize end piece is then cut off to give the gauge or bar the correct length, is then removed and finished and is finally screwed into place again as far as it will go, any final adjustment of the gauge or bar to length comprising outward adjustment of the end piece.

In order to enable the adjustable end pieces to be rotated, the body of the gauge or bar is held firmly, the end piece is clamped in a tool and the tool is rotated. Preferably, the tool used should not mark the smooth surface of the end piece and according to another aspect of the invention, there is provided a tool for adjusting the end pieces of the gauge and bar described above, the tool comprising a block of resilient metal having a hole through it, the inner surface of the hole having a smooth finish and the block being divided into two jaw members by a slit which leads into the hole, the tool further comprising a handle secured to the block for turning it and a bolt extending through one jaw member and engaged in a screw threaded hole in the other and serving to force the jaw members together in order to clamp the block firmly onto any object closely engaged in the hole.

The invention includes a measuring kit comprising body members and end pieces for point gauges or measuring bars as described above and comprising a tool as just described for inserting and adjusting the end pieces.

A point gauge and two tools which can be used for adjusting its end piece will now be described by way of example only with reference to the several figures of the accompanying drawings.

Figure 1:
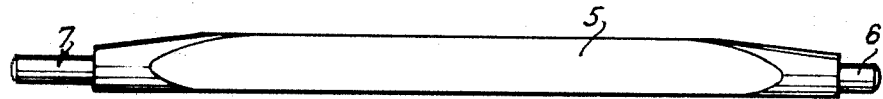
FIG. 1 is a side view of a point gauge according to the invention.

The point gauge shown in FIG. 1 comprises a body 5 of square section made from mild steel and plated to give it a hard satin chrome finish. The body has two cylindrical end pieces 6 and 7 made of tool steel hardened throughout.

The end piece 6 is ground and lapped to give it a very smooth mirror-like finish and is firmly secured to the body 5 by being pressed into a cylindrical hole in one end of the body. The end piece 6 is an interference fit in a ground and lapped portion of the hole and has a slight taper, its thicker end having a diameter 1½ to 2 thousandths of an inch bigger than the diameter of the hole. It is pushed into the hole by means of a press until a shoulder on the end piece abuts against a shoulder in the hole. The end piece cannot therefore be pushed in any further and is gripped firmly by the sides of the hole which, in fact, have to expand slightly to admit the end piece.

Figure 2:
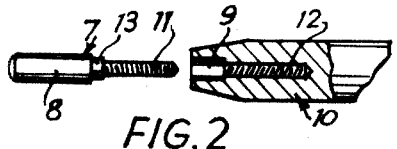
FIG. 2 is a sectional exploded view through one end of the gauge of FIG. 1.

The end piece 7 has a ground and lapped outer portion 8 part of which projects from the end of the body 5 and part of which is engaged in a ground and lapped cylindrical portion 9 of a hole 10 (FIG. 2) in the end of the body 5, the portion 8 of the end piece being an interference fit in this portion 9 of the hole. The inner portion 11 of the end piece 7 is formed with a screw thread which is engaged with a screw threaded inner portion 12 of the hole 10. Between the portions 8 and 11 of the end piece 7 is a lead-in 13.

In the present case of a 5 in. point gauge, the end piece 7 has an overall length of approximately 1½ in. the portion 8 has a length of approximately ¾ in. and the lead-in 13 a length of approximately ³⁄₃₂ in. The lead-in tapers approximately 3 thousandths of an inch and the portion 8 tapers approximately 2 thousandths of an inch over its whole length. The part of the end portion 8 which projects from the body 5 has a length of approximately ½ in. and the part within the body tapers approximately 1 thousandth of an inch.

In making the point gauge, the body 5 is first rough finished and the holes in its ends are drilled and reamed and the hole 10 is tapped. The end piece 6 already ground and lapped is then inserted. Next the end piece 7, oversize in length but already ground and lapped is inserted and is screwed home into the hole 10 as far as possible. Eventually, further entry of the end piece 7 is prevented not by abutment of any shoulder on the end piece against a shoulder in the hole but because of the immense pressure built up by the resistance to expansion of the mouth part 9 of the hole 10 which must take place to admit the end piece.

After insertion of the end piece 7 into the hole 10 as far as it will go, the end piece is cut off to the correct length and is then removed and machined to finish its outer end. The end piece is then reinserted as far as it will go and any slight shortness in the length of the gauge is taken up by adjustment of the end piece outwards by rotating it in its screw thread.

Similar adjustment can be made if the gauge wears down during use.

Figure 3:
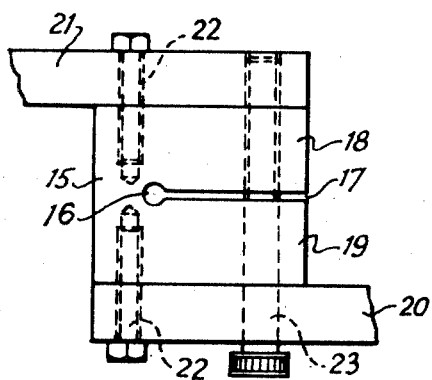
FIGS. 3 and 4 are views of two tools for adjusting the end piece of the gauge of FIG. 1.
Figure 4:
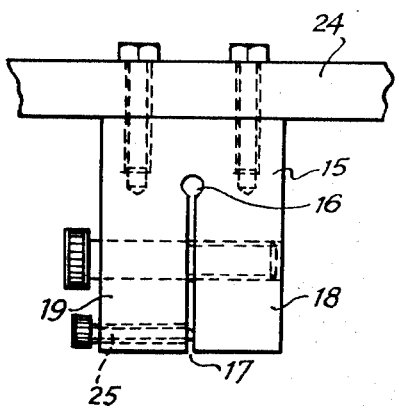

In order to enable the end piece 7 to be rotated without damaging it, either of the two tools shown in FIGS. 3 and 4 can be used.

The tool of FIG. 3 comprises a block of steel 15 formed with a ground and lapped hole 16, into which leads a slit 17 dividing the block 15 into two jaws 18 and 19. Two handles 20 and 21 are bolted to the block 15 by bolts 22. A further bolt 23 extends through the handle 20 through the jaw 19 and is engaged in screw-threaded holes in the jaw 18 and handle 21. If the end piece is inserted in the hole 16 and the bolt 23 is tightened by means of a key inserted in a shaped recess in its head, the end piece is firmly clamped in the tool. On rotating the tool by means of its handles the end piece can be screwed in or out of the body 5.

The tool shown in FIG. 4 is similar to that of FIG. 3 except that it has a single handle 24 and also has a bolt 25 engaged in a screw-threaded hole in the jaw 19 and extending through the jaw 19 so that its end abuts against the jaw 18. This bolt serves to open up the slit 17 and hole 16 should it prove difficult to release the end piece 7 from the hole.

The thread used on the end piece 7 in the present case is a 3 B.A. thread and one revolution of this thread gives a linear adjustment of the end piece of ¹⁄₈₅ in. Thus, normally, the end piece will only be turned through a fraction of a revolution to give the adjustment required. The adjustment which can be conveniently obtained from the gauge just described is up to 0.050 in. plus from size.

It is convenient for ease of manufacture to drill ream and tap the holes at each end of the body of the gauge in an identical fashion. The internal screw threads at both ends then serve for securing the body during subsequent shaping processes.

If desired, adjustable end pieces may be provided at both ends of the body.

Besides providing adjustments to allow for wear of the end pieces, the present guages can be used with a number of end pieces of different lengths to enable the gauges to be adjusted to different lengths. For example a single gauge may have two end pieces one for a length in inches and one for an adjacent metric length. If the length in inches and the adjacent metric length are close enough, adjustment of the position of a single end piece may be enough to convert from one to the other.

In a measuring bar, the end pieces would normally have flat outer ends, in the example of a point gauge described above the outer end of the end pieces are radiused. The end pieces may be provided with tungsten carbide tips to reduce wear.

The fact that the end pieces of the gauge described above are offset from the centre line of the body enables the gauge to be used in shallow recesses where it could otherwise not penetrate.

Instead of inserting the fixed end piece 6, it is possible merely to shape and harden this end of the body 5 so that it can serve as an end piece.

Figure 5:
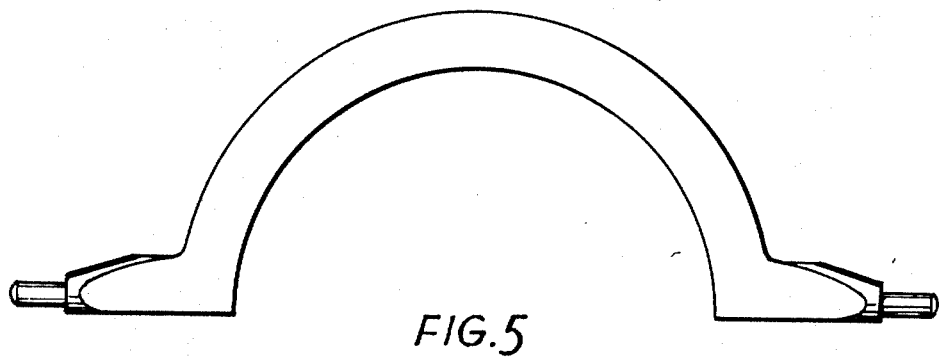
FIG. 5 shows a side view of a point gauge showing a bowed body for use on a boring machine.

As can be seen from FIG. 5 the body of the point gauge may have a bow shape to permit the gauge to be used in a bore in a workpiece held in a boring machine, the bow-shape of the gauge being able to be accommodated around the position of the boring tool.

Figure 6:
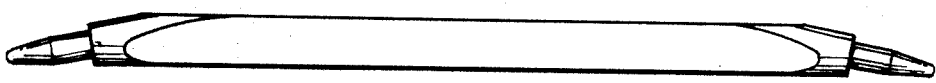
FIG. 6 shows a side view of a point gauge whose end pieces are inclined at an angle with respect to the axis of the body to permit measurements to be made within a shallow recess.

As can be seen from FIG. 6 the end pieces of the gauge may be set at a desired inclined angle with respect to the axis of the body of the gauge to permit measurements to be made across a shallow recess.

What is claimed is:

1. A point gauge comprising a longitudinal body having one body end and another body end, a cylindrical hole in said one body end and having a cylindrical outer part and a screw-threaded inner part, an end piece, said end piece having an outer portion, a non-threaded lead-in and an inner portion, said inner portion being screw-threaded and mating with said inner part, at least part of said lead-in being of larger diameter than said outer part and adapted to be inserted therein to form an interference fit, said lead-in and said outer part interengaging and creating substantial pressure between said lead-in and said outer part due to resistance to expansion of said outer part as said lead-in enters said outer part whereby retention of said end piece is obtained independently of said screw threads.

2. A gauge according to claim 1 wherein said outer portion, said lead-in and said outer part are lapped and ground to a mirror-like surface.

3. A gauge according to claim 1 wherein said end piece has a shoulder between said lead-in and said inner portion, a ledge in said hole between said outer part and said inner part, said shoulder abutting said ledge.

4. A gauge according to claim 1 wherein said lead-in is tapered toward said cylindrical hole.

5. A gauge according to claim 1 wherein said other end is provided with a further end piece and a further cylindrical hole in like manner to said end piece and said cylindrical hole.

6. A gauge according to claim 1 wherein said lead-in is tapered away from said outer portion.

7. A gauge according to claim 5 wherein said outer portion is tapered away from said lead-in.

8. A gauge according to claim 4 wherein said end piece and said further end piece are in axial alignment.

9. A gauge according to claim 4 wherein said end piece and said further end piece are axially inclined to one another.

10. A gauge according to claim 1 wherein said body comprises a substantially straight bar.

11. A gauge according to claim 1 wherein said body is substantially bow-shaped.

12. A gauge according to claim 1 wherein said lead-in and said outer part have a mirror-like finish.

References Cited
UNITED STATES PATENTS

| | | | |
|---|---|---|---|
| 2,488,319 | 11/1949 | Noel | 33—164 |
| 2,375,945 | 5/1945 | Redmer | 33—178 |
| 1,796,129 | 3/1931 | Swanson | 33—178 |
| 1,170,255 | 10/1912 | Hess | 33—168 |
| 129,536 | 7/1872 | Cross | 33—143 |

SAMUEL S. MATTHEWS, Primary Examiner